US011798171B2

(12) United States Patent
Shim et al.

(10) Patent No.: US 11,798,171 B2
(45) Date of Patent: Oct. 24, 2023

(54) WEAKLY SUPERVISED SEMANTIC SEGMENTATION DEVICE AND METHOD BASED ON PSEUDO-MASKS

(71) Applicant: UIF (University Industry Foundation), Yonsei University, Seoul (KR)

(72) Inventors: Hyunjung Shim, Incheon (KR); Seungho Lee, Seoul (KR); MinHyun Lee, Gimpo-si (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 194 days.

(21) Appl. No.: 17/520,025

(22) Filed: Nov. 5, 2021

(65) Prior Publication Data
US 2023/0093619 A1 Mar. 23, 2023

(30) Foreign Application Priority Data
Sep. 17, 2021 (KR) .......................... 10-2021-0124495

(51) Int. Cl.
*G06T 7/194* (2017.01)
*G06T 7/12* (2017.01)
*G06F 18/2431* (2023.01)

(52) U.S. Cl.
CPC .......... *G06T 7/194* (2017.01); *G06F 18/2431* (2023.01); *G06T 7/12* (2017.01)

(58) Field of Classification Search
CPC ........ G06T 7/194; G06T 7/12; G06F 18/2431
See application file for complete search history.

(56) References Cited

U.S. PATENT DOCUMENTS

2014/0321748 A1\* 10/2014 Ruan ...................... G06T 7/194
382/180

FOREIGN PATENT DOCUMENTS

| CN | 113033432 A | \* | 6/2021 |
| KR | 10-2160224 B1 | | 9/2020 |

\* cited by examiner

*Primary Examiner* — Casey L Kretzer
(74) *Attorney, Agent, or Firm* — Paratus Law Group, PLLC

(57) ABSTRACT

Discloses are weakly supervised semantic segmentation device and method based on pseudo-masks. The device includes a localization map generator configured to generate a plurality of first localization maps by providing an image to a first classifier; a saliency map processor configured to calculate a saliency loss through a saliency map used to identify a boundary line and a co-occurring pixel based on the plurality of first localization maps; a multi-label processor configured to predict a multi-label based on the plurality of first localization maps and calculate a classification loss; and a pseudo-masks generator configured to generate a second classifier obtained by updating the first classifier based on the saliency loss and the classification loss, and generate the pseudo-masks based on a plurality of second localization maps by the second classifier.

13 Claims, 8 Drawing Sheets

(a) Groundtruth (b) Saliency map (c) Localization map (d) Our EPS (a)      (b)      (c)      (d)

WEAKLY SUPERVISED SEMANTIC SEGMENTATION DEVICE AND METHOD BASED ON PSEUDO-MASKS

ACKNOWLEDGEMENT

The present patent application has been filed as a research project as described below.

National Research Development Project supporting the Present Invention
Project Serial No.: 1711126082
Project No.: 2020-0-01361-002
Department: Ministry of Science and ICT
Project management (Professional) Institute: Institute of Information & Communication Technology Planning & Evaluation
Research Project Name: Information & Communication Broadcasting Research Development Project
Research Task Name: Artificial Intelligence Graduate School Support (Yonsei University)
Contribution Ratio: 1/2
Project Performing Institute: Yonsei University Industry Foundation
Research Period: 2021.01.01~2021.12.31

National Research Development Project supporting the Present Invention
Project Serial No.: 1711138081
Project No.: KMDF_PR_20200901_0069_01
Department: other-governmental departments
Project management (Professional) Institute: Korea Medical Device Development Fund
Research Project Name: Korea Medical Device Development (R&D)
Research Task Name: (Supervised) Development of universally applicable CNN-based low-dose CT noise reduction technology
Contribution Ratio: 1/2
Project Performing Institute: Yonsei University Industry Foundation
Research Period: 2021.03.01~2022.02.28

CROSS-REFERENCE TO PRIOR APPLICATION

This application claims priority to Korean Patent Application No. 10-2021-0124495 (filed on Sep. 17, 2021), which is hereby incorporated by reference in its entirety.

BACKGROUND

The present disclosure relates to weakly supervised semantic segmentation technology, and more specifically, to a weakly supervised semantic segmentation device and method based on pseudo-masks capable of improving performance of weakly supervised learning-based semantic segmentation by utilizing a localization map and a saliency map.

Semantic segmentation is to classify an image for each pixel. That is, the semantic segmentation is to classify which class each pixel belongs to.

FIG. 1 is an exemplary diagram illustrating semantic segmentation.

Referring to FIG. 1, in the case of fully supervised semantic segmentation (FSSS), all class information of each pixel of an image is trained and predicted. On the other hand, in the case of weakly supervised semantic segmentation (WSSS), only image-level labels are used for training and classes of each image pixel are predicted.

The fully supervised learning is a method of training actual information about a location of an object included in the already generated data set among the object recognition methods through deep learning. The weakly supervised learning is a method of generating a deep learning predictive model by learning only the image and its class label in the learning process. Among object detection methods in the weakly supervised learning, class activation mapping (CAM) is a method of finding an object by extracting and visualizing discriminative features of objects from a convolutional layer.

Compared to the fully supervised semantic segmentation (FSSS), the weakly supervised semantic segmentation (WSSS) has the following problems because there is a difference in map information between a pixel-level label and an image-level label.

First, the localization map has a sparse object range that captures only a small fraction of the target objects.

Second, the localization map suffers from a problem of inconsistency of object boundary lines.

Third, the localization map does not properly distinguish pixels that are generated simultaneously with the target objects. For example, it does not properly distinguish between trains and railroads.

In order to solve this problem, the existing research can be classified into three aspects.

The first is an approach that erases pixels and ensembles score maps, or extends an object range to capture a full range of an object using its own map signal. However, since there is no clue to guide a shape of an object, an exact object boundary of a target object may not be determined.

The second is an approach that focuses on improving an object boundary of pseudo-masks, which effectively trains the object boundaries and naturally extends the pseudo-masks to the boundaries. However, since a strong correlation (i.e., co-occurrence) between foreground and background may not almost distinguish from inductive bias (i.e., frequency of observing pixels that match the target object), matching pixels of a non-target object are not distinguished from the target object.

Finally, the third is an approach that aims to mitigate the problem of co-occurrence by using additional truth masks or saliency maps. However, a strong pixel-level label is needed, which is far from the weakly supervised learning paradigm.

RELATED ART DOCUMENT

Patent Document 1

(Patent Document 0001) Korean Patent No. 10-2160224 (Sep. 21, 2020)

SUMMARY

The present disclosure provides a weakly supervised semantic segmentation device and method based on pseudo-masks capable of improving performance of weakly supervised learning-based semantic segmentation by utilizing a localization map and a saliency map.

The present disclosure provides a weakly supervised semantic segmentation device and method based on pseudo-masks capable of accurately distinguishing different objects and boundary lines through complement of a localization map calculated from a classifier trained with image-level labels and a saliency map obtained from an existing saliency detection model.

The present disclosure provides a weakly supervised semantic segmentation device and method based on pseudo-masks that proposes a new weakly supervised semantic segmentation (WSSS) framework capable of improving quality of pseudo-masks.

In an aspect, a weakly supervised semantic segmentation device based on pseudo-masks includes a localization map generator configured to generate a plurality of first localization maps by providing an image to a first classifier; a saliency map processor configured to calculate a saliency loss through a saliency map used to identify a boundary line and a co-occurring pixel based on the plurality of first localization maps; a multi-label processor configured to predict a multi-label based on the plurality of first localization maps and calculate a classification loss; and a pseudo-masks generator configured to generate a second classifier obtained by updating the first classifier based on the saliency loss and the classification loss, and generate the pseudo-masks based on a plurality of second localization maps by the second classifier.

The weakly supervised semantic segmentation device based on pseudo-masks may further include an object recognizer configured to identify an object and a boundary of the image based on the pseudo-masks.

The localization map generator may generate a foreground localization map including N (where N is a natural number) foreground objects and a background localization map including a single background object as the plurality of first localization maps.

The saliency map processor may generate a prediction saliency map by weight-calculating a foreground localization map and a background label, and determine the saliency loss corresponding to a difference between the prediction saliency map and the actual saliency map.

The saliency map processor may generate the prediction saliency map through the following equation.

$$\hat{M}_s = \lambda M_{fg} + (1-\lambda)(1-M_{bg})$$ [Equation]

The $M_s$ corresponds to the prediction saliency map, the $M_{fg}$ corresponds to the foreground localization map, and the $M_{bg}$ corresponds to the background map.

$\lambda$ is $\in [0, 1]$, and is a hyperparameter that controls a weighted sum between the foreground localization map and an inversion of the background map.

The multi-label processor may calculate, as the classification loss, a multi-label margin loss between an image level label for a foreground localization map in the plurality of first localization maps and a corresponding prediction.

The pseudo-masks generator may update the first classifier by calculating a total learning loss that is a sum of the saliency loss and the classification loss.

The pseudo-masks generator may generate the pseudo-masks with joint training through the saliency loss and the classification loss to identify the boundary line of an object and remove the co-occurring pixel.

In another aspect, a weakly supervised semantic segmentation method based on pseudo-masks includes: a localization map generating step of generating a plurality of first localization maps by providing an image to a first classifier; a saliency map processing step of calculating a saliency loss through a saliency map used to identify a boundary line and a co-occurring pixel based on the plurality of first localization maps; a multi-label processing step of predicting a multi-label based on the plurality of first localization maps and calculating a classification loss; and a pseudo-masks generating step of generating a second classifier obtained by updating the first classifier based on the saliency loss and the classification loss, and generating the pseudo-masks based on a plurality of second localization maps by the second classifier.

The weakly supervised semantic segmentation method based on pseudo-masks may further include an object recognizing step of identifying an object and a boundary of the image based on the pseudo-masks.

The localization map generator may generate a foreground localization map including N (where N is a natural number) foreground objects and a background localization map including a single background object as the plurality of first localization maps.

In the saliency map processing step, a prediction saliency map may be generated by weight-calculating a foreground localization map and a background localization map, and the saliency loss corresponding to a difference between the prediction saliency map and the actual saliency map is determined.

In the multi-label processing step, a multi-label margin loss between an image level label for a foreground localization map in the plurality of first localization maps and a corresponding prediction may be calculated as the classification loss.

The disclosed technology may have the following effects. However, since a specific embodiment is not construed as including all of the following effects or only the following effects, it should not be understood that the scope of the disclosed technology is limited to the specific embodiment.

A weakly supervised semantic segmentation device and method based on pseudo-masks according to an embodiment of the present disclosure may improve performance of weakly supervised learning-based semantic segmentation by utilizing a localization map and a saliency map.

A weakly supervised semantic segmentation device and method based on pseudo-masks according to an embodiment of the present disclosure may accurately distinguish different objects and boundaries through complementation of a localization map calculated from a classifier trained with an image-level label and a saliency map obtained from an existing saliency detection model.

A weakly supervised semantic segmentation device and method based on pseudo-masks according to an embodiment of the present disclosure may propose a new weakly supervised semantic segmentation (WSSS) framework capable of improving quality of pseudo-masks.

DETAILED DESCRIPTION

Figure 1:
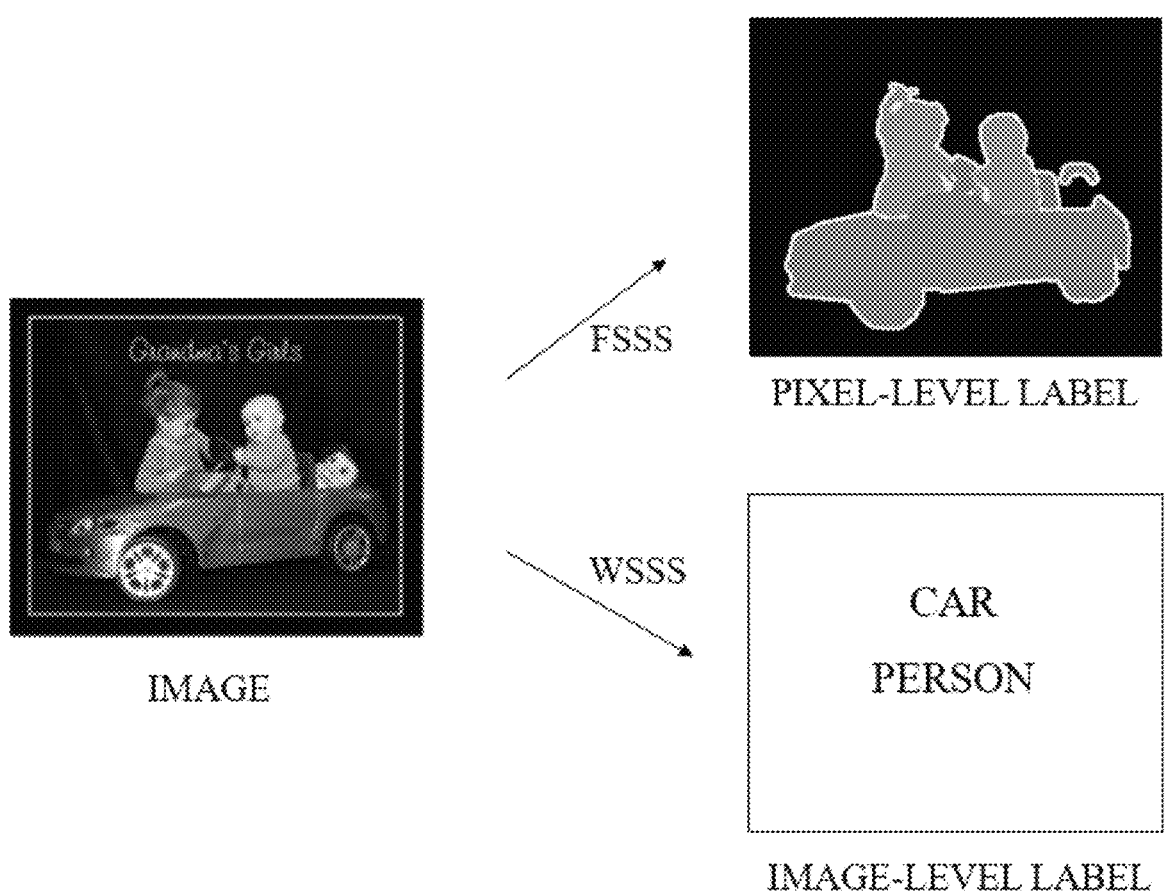
FIG. 1 is an exemplary diagram illustrating semantic segmentation.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between", "directly between", "neighboring to", "directly neighboring to" and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure can be embodied as computer readable code on a computer-readable recording medium, and the computer-readable recording medium includes all types of recording devices in which data can be read by a computer system. Examples of the computer-readable recording medium may include a read only memory (ROM), a random access memory (RAM), a compact disk read only memory (CD-ROM), a magnetic tape, a floppy disk, an optical data storage, or the like. In addition, the computer readable recording medium may be distributed in computer systems connected to each other through a network, such that the computer readable codes may be stored in a distributed scheme and executed.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

Figure 2:
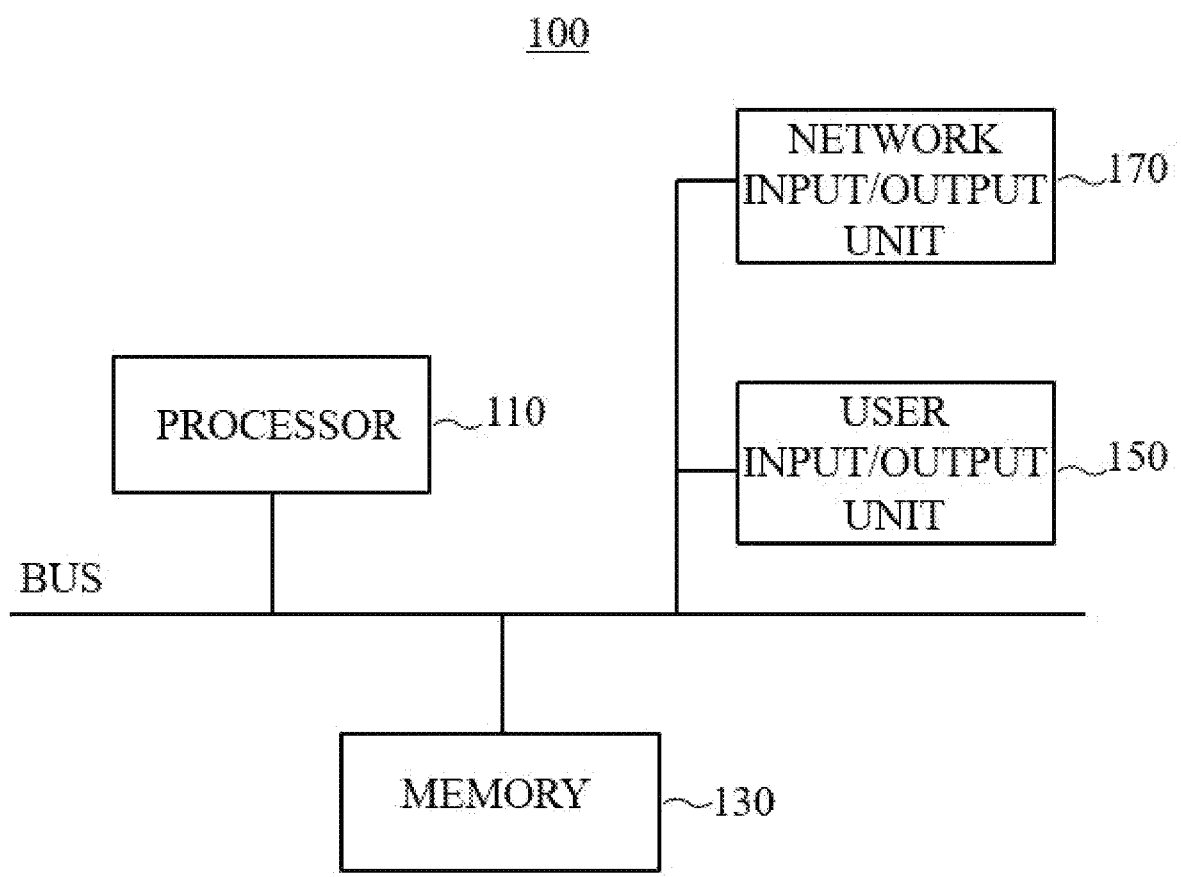
FIG. 2 is a diagram for describing a system configuration of a weakly supervised semantic segmentation device based on pseudo-masks according to the present disclosure.

FIG. 2 is a diagram for describing a system configuration of a weakly supervised semantic segmentation device based on pseudo-masks according to the present disclosure.

Referring to FIG. 2, the weakly supervised semantic segmentation device 100 may be configured to include a computing system that includes a processor 110, a memory 130, a user input/output unit 150, and a network input/output unit 170.

The processor 110 may execute a procedure for processing each step during the operation of the weakly supervised semantic segmentation device 100, manage the memory 130 that is read or written throughout the process, and schedule a synchronization time between a volatile memory and a non-volatile memory in the memory 130. The processor 110 may control the overall operation of the weakly supervised semantic segmentation device 100, and may be electrically connected to the memory 130, the user input/output unit 150, and the network input/output unit 170 to control the flow of data therebetween. The processor 110 may be implemented as a central processing unit (CPU) of the weakly supervised semantic segmentation device 100.

The memory 130 is implemented as a non-volatile memory, such as a solid state drive (SSD) or a hard disk drive (HDD), and may include an auxiliary storage device used to store overall data necessary for the weakly supervised semantic segmentation device 100 and may include a main storage device implemented as a volatile memory such as random access memory (RAM).

The user input/output unit 150 may include an environment for receiving user input and an environment for outputting specific information to a user. For example, the user input/output unit 150 may include an input device including an adapter such as a touch pad, a touch screen, an on-screen keyboard, or a pointing device, and an output device including an adapter such as a monitor or a touch screen. In one embodiment, the user input/output unit 150 may correspond to a computing device connected via remote access. In this case, the weakly supervised semantic segmentation device 100 may be performed as an independent server.

The network input/output unit 170 includes an environment for connecting with an external device or a system through a network, and may include an adapter for communication, for example, a local area network (LAN), a metropolitan area network (MAN), a wide area network (WAN), a value added network (VAN), and the like.

Figure 3:
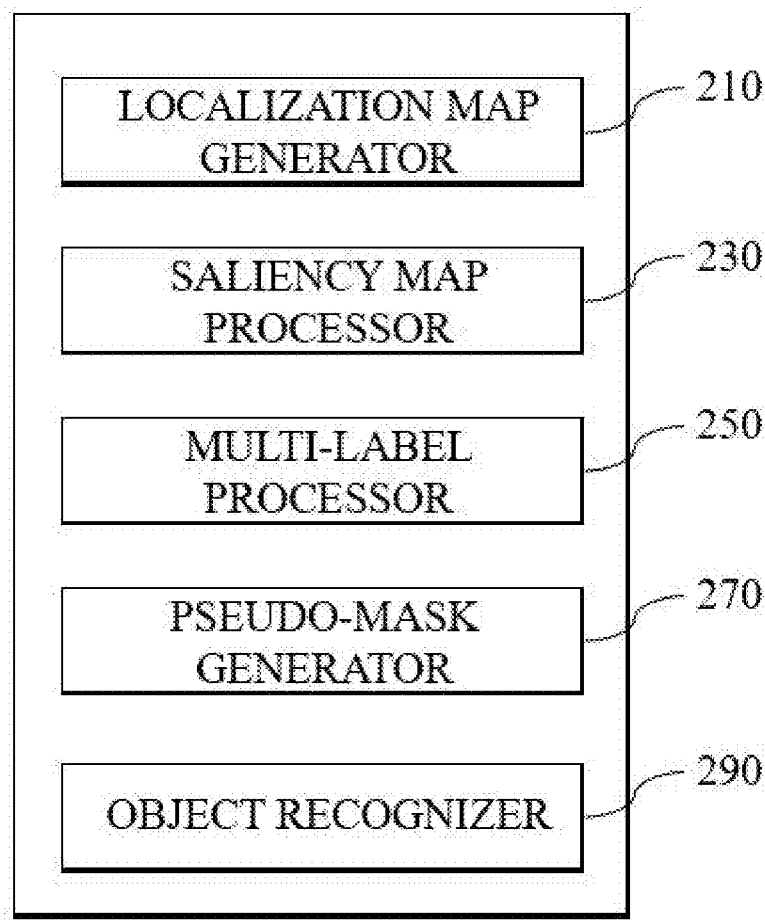
FIG. 3 is a diagram illustrating a functional configuration of a processor in the weakly supervised semantic segmentation device of FIG. 2.

FIG. 3 is a diagram illustrating a functional configuration of a processor in the weakly supervised semantic segmentation device of FIG. 2.

Referring to FIG. 3, the weakly supervised semantic segmentation device 100 may include a localization map generator 210, a saliency map processor 230, a multi-label processor 250, a pseudo-masks generator 270, and an object recognizer 290.

The localization map generator 210 may generate a plurality of first localization maps by providing an image to a first classifier; The localization map generator 210 may generate a foreground localization map including N (where N is a natural number) foreground objects and a background localization map including a single background object as the plurality of first localization maps. Here, the first classifier may be implemented in a convolutional neural network (CNN) structure and pass an image to generate first localization maps according to each class.

A CNN structure is a pooling layer that maintains a shape of input/output data of each layer, extracts and trains features of an image with a plurality of filters, and collects and strengthens the features of the extracted image, and has fewer learning parameters than general artificial neural networks. In the CNN, a filter traverses input data for image feature extraction, calculates convolution, and generates a feature map using the calculation result. The feature map may include location information of an original image.

The saliency map processor 230 may calculate a saliency loss through a saliency map used to identify a boundary line and a co-occurring pixel based on the plurality of first localization maps. The saliency map processor 230 may generate a prediction saliency map by weight-calculating the foreground localization map and the background localization map. Here, the saliency map processor 230 may predict a saliency map without class information using the first localization map generated by the localization map generator 210. The saliency map may provide object silhouettes that better represent object boundaries.

In an embodiment, the saliency map processor 230 may generate a prediction saliency map through Equation 1 below.

$$\hat{M}_s = \lambda M_{fg} + (1-\lambda)(1-M_{bg})$$ [Equation 1]

Here, the $M_s$ corresponds to the prediction saliency map, the $M_{fg}$ corresponds to the foreground localization map, and the $M_{bg}$ corresponds to the background map.

$\lambda$ is $\in [0, 1]$, and is a hyperparameter that controls a weighted sum between the foreground localization map and an inversion of the background map.

The saliency map processor 230 may determine a saliency loss corresponding to a difference between the prediction saliency map and the actual saliency map. In an embodiment, the saliency map processor 230 may calculate the saliency loss through Equation 2 below.

$$\mathcal{L}_{sal} = \frac{1}{H \cdot W} \|M_s - \hat{M}_s\|^2$$ [Equation 2]

Here, $\mathcal{L}_{sal}$ is the saliency loss, $M_s$ is the actual saliency map, and $\hat{M}_s$ is the prediction saliency map.

Here, the prediction saliency map and the actual saliency map obtained from the existing saliency detector may be used as pseudo-masks for training supervision and as clues for boundary lines and co-occurring pixels.

The multi-label processor 250 may calculate a classification loss by predicting a multi-label based on a plurality of first localization maps. The multi-label processor 250 may use a multi-label classification method to predict the multi-label in the same way as the existing classifier. The multi-label processor 250 may calculate, as the classification loss, a multi-label margin loss between an image level label for a foreground localization map in the plurality of first localization maps and a corresponding prediction.

In one embodiment, the multi-label processor 250 may calculate the classification loss through Equation 3 below.

$$\mathcal{L}_{cls} = -\frac{1}{C}\sum_{i=1}^{C} y_i \log \sigma(\hat{y}_i) + (1-y_i)\log(1 - \sigma(\hat{y}_i)).$$ [Equation 3]

Here, $\mathcal{L}_{cls}$ corresponds to the classification loss, and y and $\hat{y}$ correspond to the image level label for the foreground localization map in the plurality of first localization maps and the corresponding prediction. $\sigma(\bullet)$ is a sigmoid function.

The pseudo-masks generator 270 may generate a second classifier obtained by updating the first classifier based on the saliency loss and the classification loss, and generate the pseudo-masks based on a plurality of second localization maps by the second classifier and the second classifier. The pseudo-masks generator 270 may update the first classifier by calculating the total learning loss that is the sum of the saliency loss and the classification loss. Here, the pseudo-masks generator 270 may generate the optimized second classifier obtained by updating the first classifier by combining the saliency loss and the classification loss. In this case, the plurality of second localization maps and the saliency map by the second classifier may have a synergistic effect as complementary information.

The pseudo-masks generator 270 may generate pseudo-masks for training a segmented network by joint training through the saliency loss and the classification loss, so as to identify a boundary line of an object and remove co-occurring pixels.

The object recognizer 290 may perform object and boundary identification of an image based on the pseudo-masks. Here, the pseudo-masks may detect the entire area of the object, refine the boundary lines, and solve the problem of the co-occurring pixels.

Figure 4:
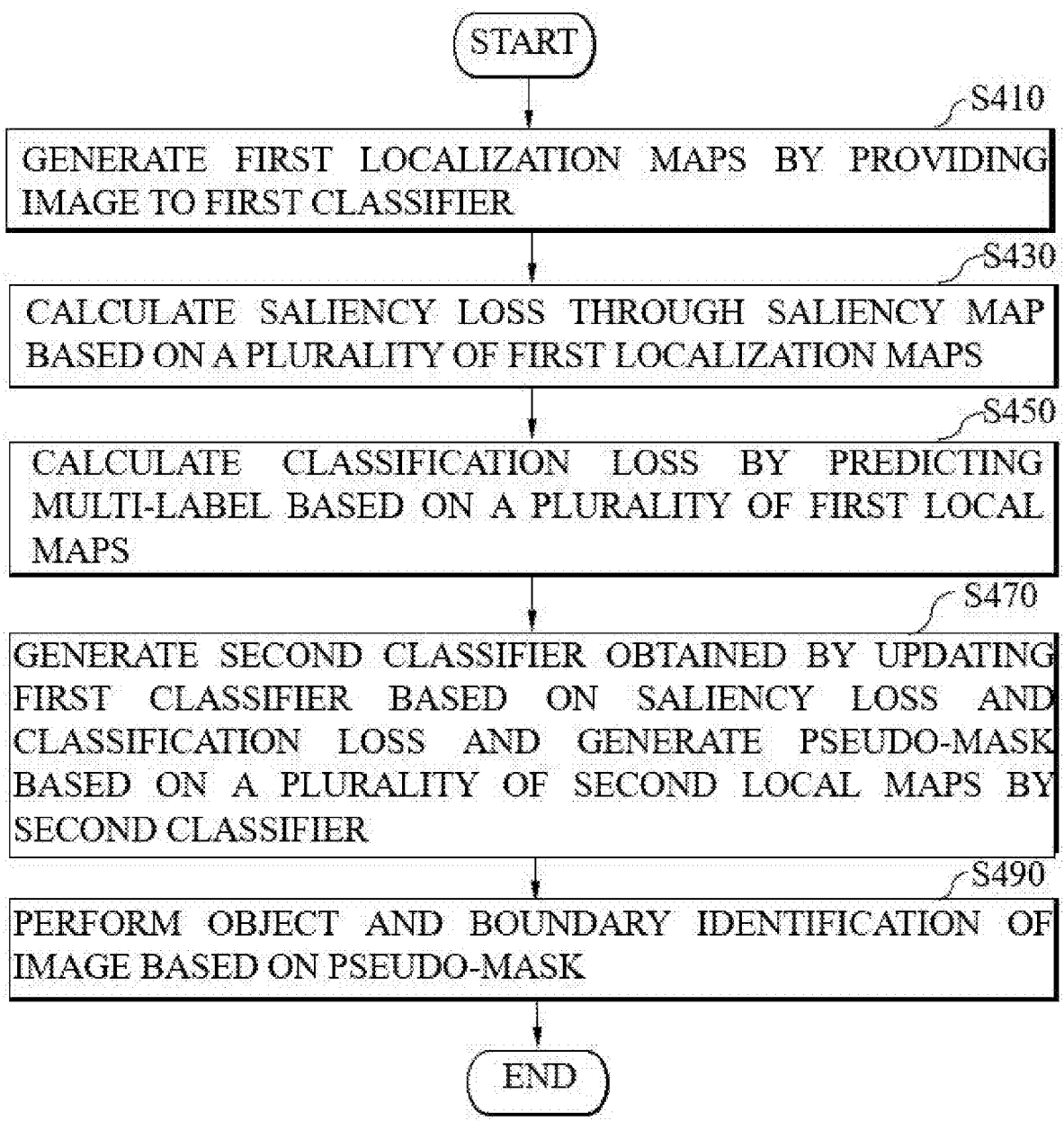
FIG. 4 is a flowchart illustrating a weakly supervised semantic segmentation process based on pseudo-masks performed in the weakly supervised semantic segmentation device of FIG. 3.

FIG. 4 is a flowchart illustrating a weakly supervised semantic segmentation process based on pseudo-masks performed in the weakly supervised semantic segmentation device of FIG. 3.

Referring to FIG. 4, the weakly supervised semantic segmentation device 100 may generate the plurality of first localization maps by providing the image to the first classifier through the localization map generator 210 (step S410). The weakly supervised semantic segmentation device 100 may calculate the saliency loss that is used to identify the boundary line and the co-occurring pixel based on the plurality of first localization maps through the saliency map processor 230 (step S430). The weakly supervised semantic segmentation device 100 may calculate the classification loss by predicting the multi-label based on the plurality of first localization maps through the multi-label processor 250 (step S450). The weakly supervised semantic segmentation device 100 may generate the second classifier obtained by updating the first classifier based on the saliency loss and the classification loss through the pseudo-masks generator 270, and generate the pseudo-masks based on the plurality of second localization maps by the second classifier (step S470). The weakly supervised semantic segmentation device 100 may perform the object and boundary identification of the image based on the pseudo-masks through the object recognizer 290 (step S490).

Figure 5:
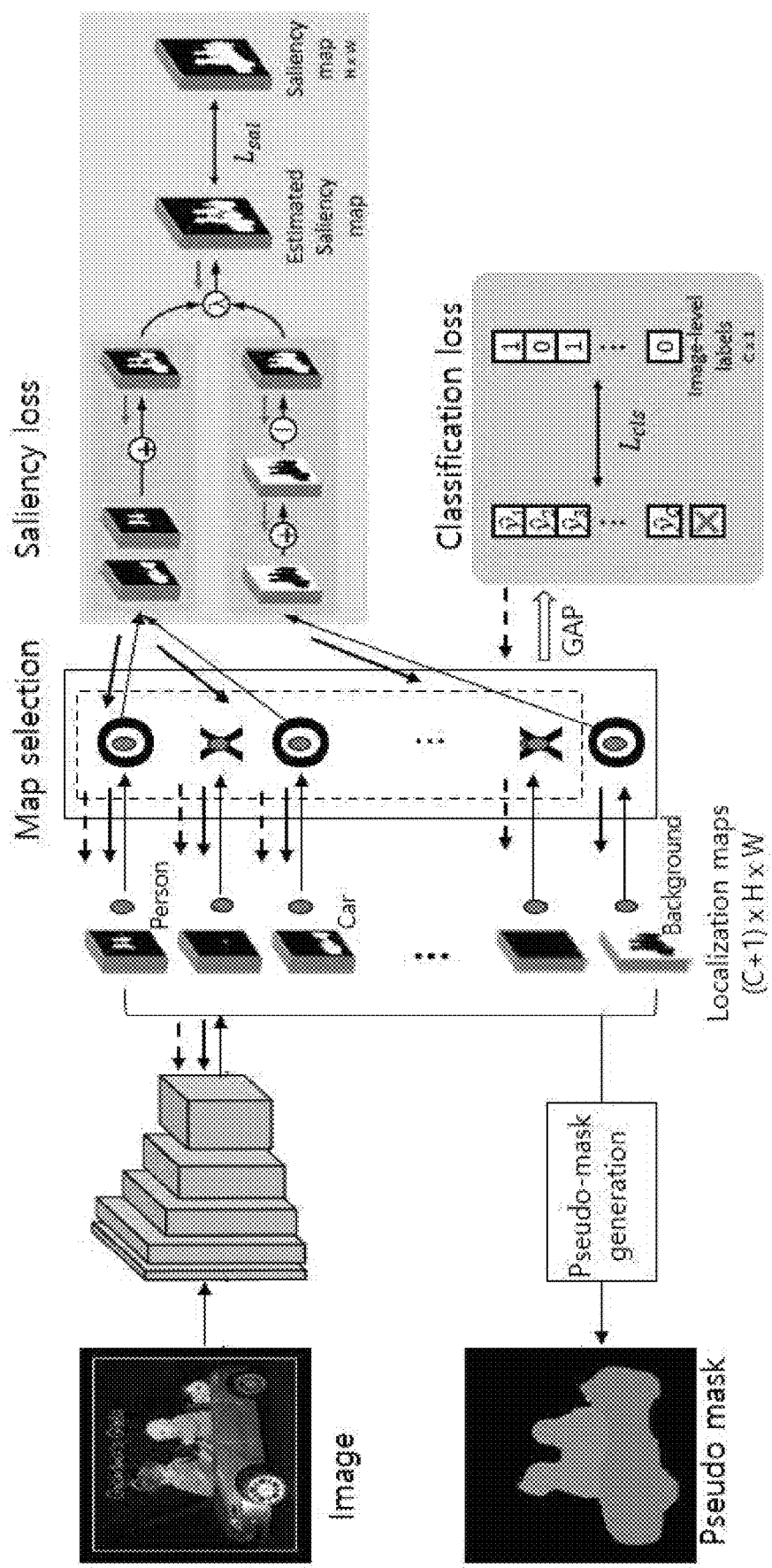
FIG. 5 is a diagram for describing an overall framework for weakly supervised semantic segmentation based on pseudo-masks according to the present disclosure.

FIG. 5 is a diagram for describing an overall framework for weakly supervised semantic segmentation based on pseudo-masks according to the present disclosure.

In FIG. 5, the present disclosure represents a new WSSS framework called explicit pseudo-pixel supervision (EPS) that integrates the saliency map into the pseudo-pixel maps in the weakly supervised semantic segmentation and uses the integrated map as a clue for the boundary and the co-occurring pixel to train pixel-level feedback in order to overcome the sparse object coverage, boundary line mismatch, and co-occurrence problem of the existing weakly supervised semantic segmentation (WSSS).

Here, in order to take full advantage of the saliency map, we may design a classifier that predicts a C+1 class composed of a C target class and a background class to train a C+1 localization map, that is, a C localization map and a background localization map for a target label. The C+1 localization map may be generated from a backbone network, and the actual saliency map may be generated from the existing saliency detection model. Some localization maps for target labels can optionally be used to generate the prediction saliency maps. The entire framework can be jointly trained with the saliency loss and the classification loss.

The boundary mismatch may be managed by utilizing the property that the saliency map may provide object silhouettes that may better represent the object boundary. That is, it is possible to improve the boundary of the object by receiving the pseudo-pixel feedback from the localization map for the target label in a way of estimating the foreground map from the C localization map and matching the estimated foreground map with the foreground of the saliency map. The background localization map may also match the saliency map to mitigate the co-occurrence pixels of a non-target object. The background localization map also receives the pseudo-pixel feedback from the saliency map, so that co-occurring pixels may be successfully assigned to the background. Most of the co-occurring pixels of the non-target object overlap the background. This is why the co-occurring pixels are separated from the target object in the present disclosure.

In order to be able to compare localization maps for each class with the saliency maps, merge the localization maps for the target label may be merged and the foreground localization map $M_{fg} \in \mathbb{R}^{H \times W}$ may be generated. Also, the foreground may be represented by performing the inversion of the background localization map, which is the localization map $M_{bg} \in \mathbb{R}^{H \times W}$ for the background map.

The saliency map may be predicted using the foreground localization map ($M_{fg}$) and the background localization map ($M_{bg}$). The saliency loss Lsal may be defined as the sum of the pixel-wise differences between the predicted saliency map and the actual saliency map.

Previously, the background map may be the localization map of the background label under the assumption that the foreground map may be the union of the localization maps for the target label. However, such naive selection rules may not be compatible with the saliency maps computed by the existing models. That is, the saliency maps often ignore some objects as saliency objects. For example, little people near the train are ignored. Since the saliency model learns statistics from different datasets, such systematic errors are unavoidable. When this error is not taken into account, the same error may propagate to the model, and thus, cause poor performance.

To solve the systematic error, it is possible to use the overlap ratio between the localization map and the saliency map. Specifically, the i-th localization map $M_i$ may be assigned to the foreground when $M_i$ overlaps the saliency map by more than τ%, otherwise it may be assigned to the background. The foreground and background localization maps may be generated through Equation 4 below.

$$M_{fg} = \sum_{i=1}^{C} y_i \cdot M_i \cdot 1[O(M_i, M_s) > \tau],$$ [Equation 4]

$$M_{bg} = \sum_{i=1}^{C} y_i \cdot M_i \cdot 1[O(M_i, M_s) \leq \tau] + M_{C+1}$$

Here, $y \in \mathbb{R}^C$ a binary image level label, and $O(M_i, M_s)$ is a function that calculates the overlap ratio between $M_i$ and Ms.

To this end, the localization map and the saliency map are first binarized. For pixel p, if $M_k(p) > 0.5$, $B_k(p)=1$; $B_k(p)=0$, and otherwise, $B_i$ and $B_s$ are the binarized maps corresponding to $M_i$ and $M_s$, respectively. Then, the overlap ratio between $M_i$ and $M_s$, that is, $O(M_i, M_s)=|B_i \cap B_s|/|B_i|$ is calculated.

Instead of a single localization map for the background label, the localization map for the background label is combined with the localization map that is not selected for the foreground. Through this, it is possible to bypass the errors of the saliency map and effectively train some objects ignored in the saliency map.

Next, in the framework of the present disclosure, an objective function may be formulated into two parts: a saliency loss and a multi-label classification loss through the saliency map. The classification loss can be calculated by the multi-label margin loss between the image level label and the prediction $\hat{y} \in \mathbb{R}^C$ which is a global average pooling result of the localization map for each target class.

Finally, the total training loss is the sum of the multi-label classification loss and the saliency loss. That is, Ltotal=Lcls+Lsal.

The saliency loss Lsal is involved in updating parameters of the C+1 class, including the target object and background. On the other hand, the classification loss Lcls evaluates only the label prediction for the C class, excluding the background class. The gradient of the classification loss Lcls does not flow into the background class. However, the prediction of the background class may be implicitly affected by the classification loss Lcls as it guides classifier training.

Figure 6:
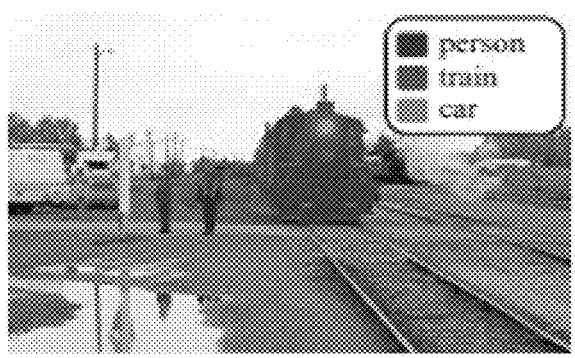
FIG. 6 is a diagram for describing a case in which both a localization map and a saliency map according to the present disclosure are used.
Figure 6:
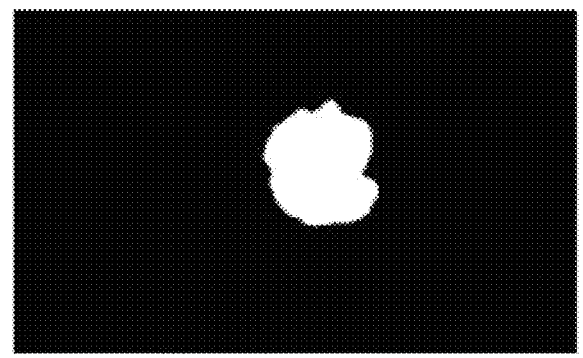
Figure 6:
Figure 6:
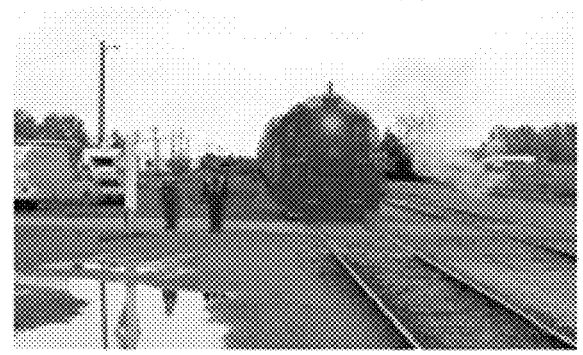

FIG. 6 is a diagram for describing a case in which both the localization map and the saliency map according to the present disclosure are used.

Referring to FIG. 6, FIG. 6A illustrates Groundtruth including people, trains, and cars is real (Groundtruth), FIG. 6B illustrates the saliency map through PFAN, FIG. 6C illustrates a localization map through CAM, and FIG. 6D illustrates the weakly supervised semantic segmentation according to the present disclosure using both the saliency map and the localization map, respectively. As illustrated in FIGS. 6B and 6C, the saliency map may not capture people and cars, and the localization map overcaptures both objects. In other words, the localization map may distinguish different objects, but does not effectively distinguish boundaries. The saliency map provides rich boundary information, but does not reveal the identity of the object. In contrast, the present disclosure using both the localization map and the saliency map as illustrated in FIG. 6D may accurately classify people, trains, and cars as illustrated in FIG. 6A.

Figure 7:
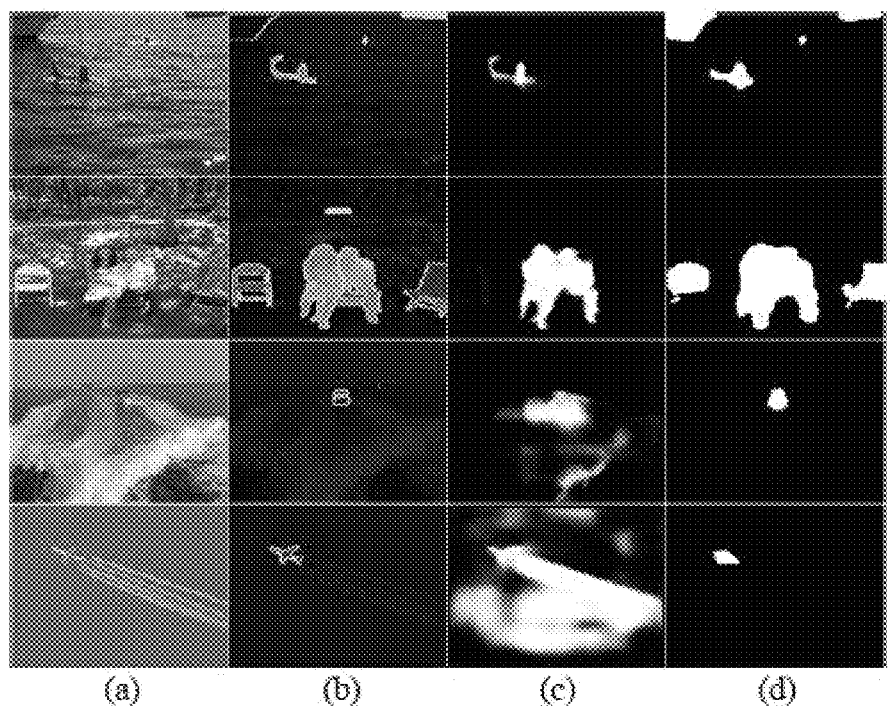
FIG. 7 is an exemplary diagram illustrating a prediction saliency map.

FIG. 7 is an exemplary diagram illustrating a prediction saliency map, and is a qualitative example of the saliency map predicted in PASCAL VOC 2012.

In FIG. 7, FIG. 7A is an input image, FIG. 7B is a Groundtruth, FIG. 7C is a saliency map, and FIG. 7D is a saliency map predicted in the present disclosure.

In the present disclosure, by jointly training two objects, it is possible to create a synergistic effect with the complementary information of the localization map and the saliency map. That is, as illustrated in FIG. 7, it can be seen that each other's noise and missing information are supplemented through the joint training strategy. The saliency map (c) obtained from the existing model has missing and noisy information, whereas the saliency map (d) predicted in the present disclosure shows that the missing object (boat or chair) is successfully restored and the noise (water droplets or contrails) have been removed. As a result, the present disclosure has the advantage of capturing more accurate object boundaries and separating co-occurring pixels from the target object. This advantage showed that the accuracy of semantic segmentation was improved by up to 3.8 to 10.6% compared to the previous model.

In the present disclosure, a performance experiment on EPS, a newly proposed weakly supervised semantic segmentation method is conducted.

Experimental Setup

Data Set: An empirical study was performed on two popular benchmark data sets: PASCAL VOC 2012 and MS COCO 2014. PASCAL VOC 2012 is composed of 21 classes (i.e., 20 objects and backgrounds), with 1,464, 1,449, and 1,456 images for training, verification, and test sets, respectively. In accordance with the general practice of the semantic segmentation, an augmented training set with 10,582 images is used. Next, COCO 2014 is composed of 81 classes including backgrounds with 82,081 and 40,137 images for training and verification, excluding an image without a target class. Since the Groundtruth segmentation labels of some objects overlap each other, COCO-Stuffs Groundtruth segmentation labels are employed to solve the overlapping problem in the same COCO data set.

Evaluation protocol: The method is verified with the verification and test set of the PASCAL VOC 2012 and the verification set of the COCO 2014. The evaluation results for the test set of the PASCAL VOC 2012 are taken from the official PASCAL VOC evaluation server. In addition, a mean intersection-over-union (mIoU) is employed to measure the accuracy of the segmentation model.

Implementation details: ResNet38 was chosen as the backbone network of the method with an output stride of 8. All the backbone models were pre-trained on ImageNet. An SGD optimizer with a batch size of 8 is used. The method is trained for 20,000 iterations with a learning rate of 0.01 (0.1 for the last convolutional layer). Random resizing, random flipping, and random cropping to 448λ448 are used for data augmentation. For the segmentation network, DeepLabLargeFOV (V1) and DeepLab-ASPP (V2) and VGG16 are employed. ResNet101 for their backbone networks, specifically, four segmentation networks of VGG16-based DeepLab-V1 and DeepLab-V2, and ResNet101-based DeepLab-V1 and DeepLab-V2 are used.

Experimental Result

1) Boundary and Co-Occurring Processing

Boundary mismatch problem: To verify a boundary of pseudo-masks, the quality of the boundary is compared with the state-of-the-art method. PASCAL VOC 2011 utilizes SBD providing boundary annotations and boundary benchmarks. The boundary quality is evaluated in a class-agnostic manner by calculating the boundary of pseudo-masks in the Laplacian boundary detector. Then, the boundary quality is evaluated by measuring recall, precision, and F1-score, and compared with predicted and actual boundaries. As shown in Table 1 below, the comparison results show that the present disclosure greatly outperforms other methods in all three evaluation indicators.

TABLE 1

| Method | Recall (%) | Precision (%) | F1-score (%) |
|---|---|---|---|
| CAM [52]$_{CVPR'16}$ | 22.3 | 35.8 | 27.5 |
| SEAM [41]$_{CVPR'20}$ | 40.2 | 45.0 | 42.5 |
| BES [32]$_{ECCV'20}$ | 45.5 | 46.4 | 45.9 |
| Our EPS | 60.0 | 73.1 | 65.9 |

Figure 8:
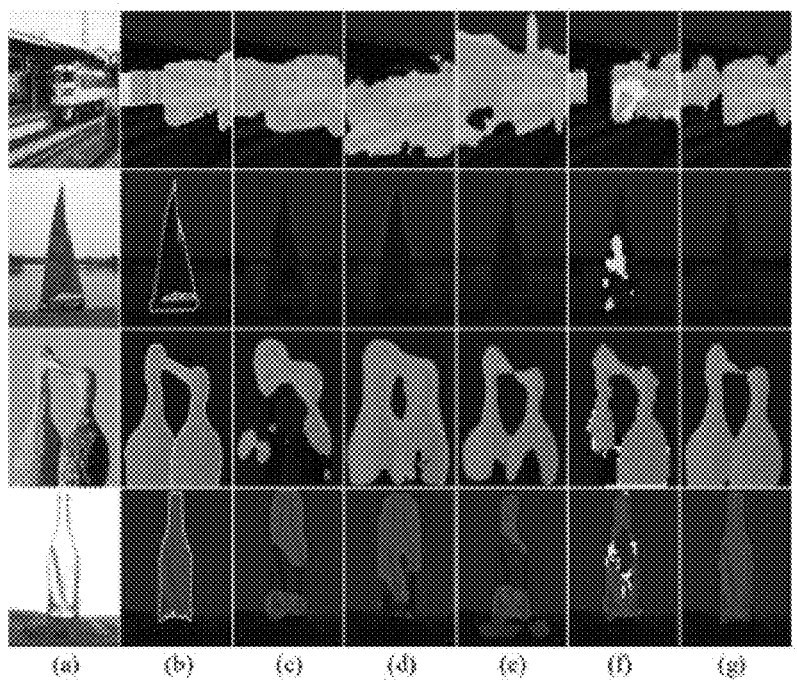
FIG. 8 is a diagram illustrating a qualitative example of boundary capture according to the present disclosure.

FIG. 8 is a diagram illustrating a qualitative example of boundary capture according to the present disclosure.

In FIG. 8, FIG. 8A illustrates input images, FIG. 8B illustrates Groundtruth, FIG. 8C illustrates CAM, FIG. 8D illustrates SEAM, FIG. 8E illustrates ICD, FIG. 8F illustrates SGAN, and FIG. 8G illustrates a qualitative comparison for the pseudo-masks for each EPS method.

As can be seen from the comparison result figure in FIG. 8, the EPS method presented in the present disclosure may capture the boundary more accurately than all other methods.

Co-occurring problem: As discussed in several studies, we observed frequent occurrences of some background classes with target objects in PASCAL VOC 2012. Here, the PASCAL-CONTEXT data set is used to quantitatively analyze the frequency of co-occurring objects. Pixel-level annotations for entire scenes (e.g., water and railroads) are provided. Three co-occurring pairs are selected: A boat with water, a train on rails, a train on a platform. A intersection-over-union (IoU) for the target class and a confusion ratio between the class matching the target class are compared. The confusion ratio measures the degree to which the matching class is incorrectly predicted as the target class. The confusion ratio mk,c is calculated as $m_{k,c}=FP_{k,c}/TP_c$. Here, $FP_{k,c}$ is the number of pixels misclassified into the target class c for the matching class k and $TP_c$ is the number of correctly classified pixels for the target class c. Table 2 below shows the comparison results with each of the existing methods for dealing with the problem of co-occurrence.

TABLE 2

| Method | boat w/ water | train w/ railroad | train w/ platform |
|---|---|---|---|
| CAM [52]$_{CVPR'16}$ | 0.74 (33.1) | 0.11 (52.9) | 0.09 (49.6) |
| SEAM [41]$_{CVPR'20}$ | 1.13 (30.7) | 0.24 (48.6) | 0.20 (45.5) |
| IDC [13]$_{CVPR'20}$ | 0.47 (41.4) | 0.11 (56.7) | 0.09 (49.2) |
| SGAN [47]$_{ACCESS'20}$ | 0.10 (42.3) | 0.02 (48.8) | 0.01 (36.3) |
| Our EPS | 0.10 (55.0) | 0.02 (78.1) | 0.01 (73.0) |

For each item in Table 2, the lower the confusion ratio, the better, and the higher IoU in parentheses, the better.

It may be seen that the EPS of the present disclosure consistently shows a lower confusion ratio than other existing methods. The SGAN has a fairly similar confusion ratio to the present disclosure, but the present disclosure captures the target class much more accurately in terms of IoU. The SEAM is higher and much worse compared to the CAM in terms of the confusion ratio. This is because the SEAM learns a method of covering the entire range of a target object by applying self-supervised training to matching pixels that is easily fooled by the target object. On the other hand, the CAM captures only the most distinct regions of the target object and does not cover less distinct parts (e.g., matching classes). This may also be seen in FIG. 8 above.

2) Effect of Map Selection Strategy

Evaluate the effectiveness of the map selection strategy to mitigate the errors of the saliency map. Three different map selection strategies are compared with a baseline that does not use the map selection module. As a basic strategy, the foreground map is the union of all object localization maps. The background map is the same as the localization map of the background class (i.e., the default strategy). Next, it follows the naive strategy with the following exceptions. A localization map of several predefined classes (e.g., sofa, chair, and dining table) is assigned to a background map (i.e., a predefined class strategy). Finally, the proposed selection method utilizes the overlap ratio between the localization map and the saliency map as described above (i.e., adaptation strategy).

Table 3 below shows that the adaptation strategy may effectively deal with the systematic bias of the saliency map.

TABLE 3

|  | Baseline | Naive | Pre-defined | Our adaptive |
|---|---|---|---|---|
| mIoU | 66.1 | 66.5 | 67.9 | 69.4 |

Referring to Table 3, the navie strategy implies no bias considerations when generating predicted saliency maps from localization maps. In this case, the performance of pseudo-masks is degraded, especially in sofa, chair or table classes. The performance of using predefined classes shows that bias may be mitigated by ignoring missing classes in the saliency map. However, since human observers need to manually select these classes, it is impractical and may not make optimal decisions on an image-by-image basis. On the other hand, the adaptive strategy of the present disclosure may process biases automatically and make more effective decisions for a given saliency map.

3) Comparison with State-of-Art Technology

Accuracy of pseudo-masks: Multi-scale inference is employed by aggregating prediction results from images of different scales which is a common practice. Then, the accuracy of the pseudo-masks is evaluated on the train set by comparing the EPS with the reference CAM and the three state-of-the-art methods, SEAM, ICD, and SGAN. Here, measuring the accuracy of the pseudo-masks of the train set is a common protocol in the WSSS because the pseudo-masks of the train set are used to guide the segmentation model.

Table 4 summarizes the accuracy of the pseudo-masks and indicates that the EPS method clearly outperforms all the existing methods by a large margin (i.e., 7 to 21% gap).

TABLE 4

| Method | w/o refinement | w/ CRF [26] | w/ AffinityNet [2] |
|---|---|---|---|
| CAM [52]$_{CVPR'16}$ | 48.0 | — | 58.1 |
| SEAM [41]$_{CVPR'20}$ | 55.4 | 56.8 | 63.6 |
| IDC [32]$_{CVPR'20}$ | 59.9 | 62.2 | — |
| SGAN [47]$_{ACCESS'20}$* | 62.8 | — | — |
| Our EPS | 69.4 | 71.4 | 71.6 |

It may be confirmed that the EPS method significantly improved the object boundary even in FIG. 8 and outperforms the three other state-of-the-art methods in terms of the quality of the pseudo-masks. The EPS method according to the present disclosure is able to capture the exact boundaries of an object so that it may naturally cover the entire range of the object and also mitigate the matching pixels.

Accuracy of segmentation map: Previous methods generate the pseudo-masks and improve the pseudo-masks using CRF post-processing algorithms or affinity networks. On the other hand, as illustrated in Table 5 above, the generated pseudo-masks are sufficiently accurate to train the segmentation network without further improvement on the pseudo-masks. When we extensively evaluate the EPS method in the present disclosure and compare the EPS method accurately with other methods in four segmentation networks of the Pascal VOC 2012 data set, the EPS method can perform much better than the other methods regardless of the segmentation network.

Table 5 shows that the EPS method is more accurate than other methods using the same VGG16 backbone.

TABLE 5

| Method | Seg. | Sup. | val | test |
|---|---|---|---|---|
| SEC [25]$_{ECCV'16}$ | V1 | I. | 50.7 | 51.7 |
| AffinityNet [2]$_{CVPR'18}$ | V1 | I. | 58.4 | 60.5 |
| IDC [13]$_{CVPR'20}$ | V1 | I. | 61.2 | 60.9 |
| BES [32]$_{ECCV'20}$ | V1 | I. | 60.1 | 61.1 |
| GAIN [28]$_{CVPR'18}$ | V1 | I. + S. | 55.3 | 56.8 |
| MCOF [40]$_{CVPR'18}$ | V1 | I. + S. | 56.2 | 57.6 |
| SSNet [48]$_{ICCV'19}$ | V1 | I. + S. | 57.1 | 58.6 |
| DSRG [20]$_{CVPR'18}$ | V2 | I. + S. | 59.0 | 60.4 |
| SeeNet [19]$_{NewEPS'18}$ | V1 | I. + S. | 61.1 | 60.7 |
| MDC [44]$_{CVPR'18}$ | V1 | I. + S. | 60.4 | 60.8 |
| FickleNet [27]$_{CVPR'18}$ | V2 | I. + S. | 61.2 | 61.9 |
| OAA [21]$_{ICCV'19}$ | V1 | I. + S. | 63.1 | 62.8 |
| ICD [13]$_{CVPR'20}$ | V1 | I. + S. | 64.0 | 63.9 |
| Multi-Est. [14]$_{ECCV'20}$ | V1 | I. + S. | 64.6 | 64.2 |
| Split. & Merge. [50]$_{ECCV'20}$ | V2 | I. + S. | 63.7 | 64.5 |
| SGAN [47]$_{ACCESS'20}$ | V2 | I. + S. | 64.2 | 65.0 |
| Our EPS | V1 | I. + S. | 66.6 | 67.9 |
|  | V2 | I. + S. | 67.0 | 67.3 |

The results of EPS for VGG16 are comparable or better than other existing methods based on stronger backbones (e.g., ResNet101). This shows that the EPS method is a clear improvement over the existing method.

Table 6 shows that the EPS method (in DeepLabV1 based on ResNet101 with saliency map) on the PASCAL VOC 2012 data set achieves a new state-of-the-art performance (71.0 for validation and 71.8 for test set).

TABLE 6

| Method | Seg. | Sup. | val | test |
|---|---|---|---|---|
| ICD [13]$_{CVPR'20}$ | V1 | I. | 64.1 | 64.3 |
| SC-CAM [5]$_{CVPR'20}$ | V1 | I. | 66.1 | 65.9 |
| BES [32]$_{ECCV'20}$ | V2 | I. | 65.7 | 66.6 |
| LIID [31]$_{TPAMI'20}$ | V2 | I. | 66.5 | 67.5 |
| MCOF [40]$_{CVPR'18}$ | V1 | I. + S. | 60.3 | 61.2 |
| SeeNet [19]$_{NewIPS'18}$ | V1 | I. + S. | 63.1 | 62.8 |
| DSRG [20]$_{CVPR'18}$ | V2 | I. + S. | 61.4 | 63.2 |
| FickleNet [27]$_{CVPR'18}$ | V2 | I. + S. | 64.9 | 65.3 |
| OAA [21]$_{ICCV'19}$ | V1 | I. + S. | 65.2 | 66.4 |
| Multi-Est. [14]$_{ECCV'19}$ | V1 | I. + S. | 67.2 | 66.7 |
| MCIS [38]$_{ECCV'20}$ | V1 | I. + S. | 66.2 | 66.9 |
| SGAN [47]$_{ACCESS'20}$ | V2 | I. + S. | 67.1 | 67.2 |
| ICD [13]$_{CVPR'20}$ | V1 | I. + S. | 67.8 | 68.0 |
| Our EPS | V1 | I. + S. | 71.0 | 71.8 |
|  | V2 | I. + S. | 70.9 | 70.8 |

While it is emphasized that the gain achieved by the existing state-of-the-art model is around 1%, the EPS method in the present disclosure may achieve gains over 3% higher than the previous high.

Figure 9:
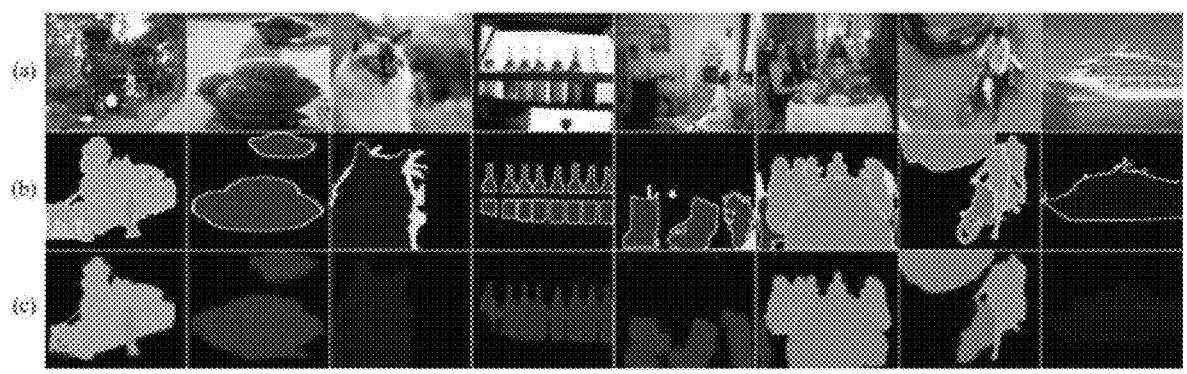
FIG. 9 is a diagram visualizing a qualitative example of a result of weakly supervised semantic segmentation based on pseudo-masks according to an embodiment.

FIG. 9 is a diagram visualizing a qualitative example of a result of weakly supervised semantic segmentation based on pseudo-masks according to an embodiment.

In FIG. 9, FIG. 9A illustrates input images, FIG. 9B illustrates Groundtruth, and FIG. 9C illustrates a segmentation result. The segmentation result in FIG. 9C can confirm that the EPS method presented in the present disclosure provides accurate boundaries and successfully solves the co-occurrence problem.

Table 7 below shows the segmentation results in MS COCO 2014.

TABLE 7

| Method | Seg. | Sup. | val |
|---|---|---|---|
| SEC [25]$_{ECCV'16}$ | V1 | I. | 22.4 |
| DSRG [20]$_{CVPR'18}$ | V2 | I. + S. | 26.0 |
| ADL [9]$_{IPAMI'20}$ | V1 | I. + S. | 30.8 |
| SGAN [47]$_{ACCESS'20}$ | V2 | I. + S. | 33.6 |
| Our EPS | V2 | I. + S. | 35.7 |

VGG16-based DeepLab-V2 is used as the segmentation network for comparison with the SGAN, the latest WSSS model in the MS COCO 2014 data set. The EPS method achieved 35.7 mIoU in the validation set, which was 1.9% higher than that of the SGAN. As a result, new state-of-the-art accuracies were achieved in the COCO 2014 data set. This outstanding performance on the existing state-of-the-art of both data sets may confirm the effectiveness of the EPS method. By utilizing both the the localization map and the saliency map, it is possible to correctly capture the entire area of the target object and compensate for the shortcomings of the existing model.

Effect of saliency detection model: To investigate the effectiveness of different saliency detection models, three saliency models were employed: PFAN (default value), DSS used in OAA and ICD, and USPS (i.e., unsupervised detection model). In Resnet101-based DeepLab-V1, the segmentation results (mIoU) were 71.0/71.8 in PFAN, 70.0/70.1 in DSS, and 68.8/69.9 in USPS (validation set and test set), respectively. This score supports that EPS using one of the three different saliency models is still more accurate than all other methods in Table 6 above. In particular, the EPS using unsupervised saliency model using the supervised saliency model outperforms all the existing methods.

The present disclosure proposes a new weakly supervised semantic segmentation based on pseudo-masks framework (EPS) by learning the joined pseudo-pixel feedback training of the saliency map and the localization map through mutual complementation between localization maps and saliency maps, so the noise or omission information may be supplemented. Therefore, the quality of the pseudo-masks may be greatly improved by capturing accurate object boundaries and discarding co-occurring pixels of non-target objects.

Although exemplary embodiments of the present invention have been disclosed hereinabove, it may be understood by those skilled in the art that the present invention may be variously modified and altered without departing from the scope and spirit of the present invention described in the following claims.

What is claimed is:

1. A weakly supervised semantic segmentation device based on pseudo-masks, comprising:

a localization map generator configured to generate a plurality of first localization maps by providing an image to a first classifier;

a saliency map processor configured to calculate a saliency loss through a saliency map used to identify a boundary line and a co-occurring pixel based on the plurality of first localization maps;

a multi-label processor configured to predict a multi-label based on the plurality of first localization maps and calculate a classification loss; and a pseudo-masks generator configured to generate a second classifier obtained by updating the first classifier based on the saliency loss and the classification loss, and generate the pseudo-masks based on a plurality of second localization maps by the second classifier.

2. The weakly supervised semantic segmentation device based on pseudo-masks of claim 1, further comprising: an object recognizer configured to identify an object and a boundary of the image based on the pseudo-masks.

3. The weakly supervised semantic segmentation device based on pseudo-masks of claim 1, wherein the localization map generator generates a foreground localization map including N (where N is a natural number) foreground objects and a background label including a single background object as the plurality of first localization maps.

4. The weakly supervised semantic segmentation device based on pseudo-masks of claim 1, wherein the saliency map processor generates a prediction saliency map by weigh-calculating a foreground localization map and a background map, and determines the saliency loss corresponding to a difference between the prediction saliency map and the actual saliency map.

5. The weakly supervised semantic segmentation device based on pseudo-masks of claim 4, wherein the saliency map processor generates the prediction saliency map through the following equation:

$$\hat{M}_s = \lambda M_{fg} + (1-\lambda)(1-M_{bg}) \quad \text{[Equation]}$$

wherein, the $M_s$ corresponds to the prediction saliency map, the $M_{fg}$ corresponds to the foreground localization map, and the $M_{bg}$ corresponds to the background map, and $\lambda$ is $\in [0, 1]$, and is a hyperparameter that controls a weighted sum between the foreground localization map and an inversion of the background map.

6. The weakly supervised semantic segmentation device based on pseudo-masks of claim 1, wherein the multi-label processor calculates, as the classification loss, a multi-label margin loss between an image level label for a foreground localization map in the plurality of first localization maps and a corresponding prediction.

7. The weakly supervised semantic segmentation device based on pseudo-masks of claim 1, wherein the pseudo-masks generator updates the first classifier by calculating a total learning loss that is a sum of the saliency loss and the classification loss.

8. The weakly supervised semantic segmentation device based on pseudo-masks of claim 1, wherein the pseudo-masks generator generates the pseudo-masks with joint training through the saliency loss and the classification loss to identify the boundary line of an object and remove the co-occurring pixel.

9. A weakly supervised semantic segmentation method based on pseudo-masks, comprising:

a localization map generating step of generating a plurality of first localization maps by providing an image to a first classifier;

a saliency map processing step of calculating a saliency loss through a saliency map used to identify a boundary line and a co-occurring pixel based on the plurality of first localization maps;

a multi-label processing step of predicting a multi-label based on the plurality of first localization maps and calculating a classification loss; and a pseudo-masks generating step of generating a second classifier obtained by updating the first classifier based on the saliency loss and the classification loss, and generating the pseudo-masks based on a plurality of second localization maps by the second classifier.

10. The weakly supervised semantic segmentation method based on pseudo-masks of claim 9, further comprising: an object recognizing step of identifying an object and a boundary of the image based on the pseudo-masks.

11. The weakly supervised semantic segmentation method based on pseudo-masks of claim 9, wherein the localization map generator generates a foreground localization map including N (where N is a natural number) foreground objects and a background localization map including a single background object as the plurality of first localization maps.

12. The weakly supervised semantic segmentation method based on pseudo-masks of claim 9, wherein, in the saliency map processing step, a prediction saliency map is generated by weight-calculating a foreground localization map and a background localization map, and the saliency loss corresponding to a difference between the prediction saliency map and the actual saliency map is determined.

13. The weakly supervised semantic segmentation method based on pseudo-masks of claim 9, wherein, in the multi-label processing step, a multi-label margin loss between an image level label for a foreground localization map in the plurality of first localization maps and a corresponding prediction is calculated as the classification loss.

* * * * *